United States Patent [19]

Naarmann et al.

[11] 4,084,048

[45] Apr. 11, 1978

[54] POLYMERS CONTAINING DIOXYTHIAZOLE-2-OXIDE GROUPS

[75] Inventors: Herbert Naarmann, Wattenheim; Heinz Pohlemann, Limburgerhof, both of Germany

[73] Assignee: BASF Aktiengesellschaft, Ludwigshafen, Germany

[21] Appl. No.: 615,535

[22] Filed: Sep. 22, 1975

[30] Foreign Application Priority Data

Oct. 5, 1974 Germany .............................. 2447658

[51] Int. Cl.² .............................................. C08F 28/06
[52] U.S. Cl. .............................. 526/260; 260/47 UA; 260/79.3 MU; 260/DIG. 17
[58] Field of Search ................... 526/260, 258; 260/47 UA, 79.3 MU

[56] References Cited

U.S. PATENT DOCUMENTS

| | | | |
|---|---|---|---|
| 3,190,850 | 6/1965 | Burke, Jr. | 260/38 |
| 3,480,595 | 11/1969 | Burk, Jr. | 526/260 X |

*Primary Examiner*—Christopher A. Henderson
*Attorney, Agent, or Firm*—Keil, Thompson & Shurtleff

[57] ABSTRACT

Polyfunctional polymers of which the side branches contain dioxathiazole-2-oxide groups are described. They possess the reactivity of dioxathiazole-2-oxide and can in addition contain other reactive groups. They can be used for the manufacture of moldings, coatings or adhesives.

8 Claims, No Drawings

POLYMERS CONTAINING DIOXYTHIAZOLE-2-OXIDE GROUPS

The present invention relates to new polymers and to a process for their manufacture.

It is an object of the present invention to provide polymers which exhibit the reactivity of dioxathiazole-2-oxide and can in addition contain other reactive groups.

We have found that this object is achieved by polymers which contain structural elements of the general formula

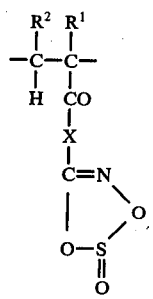

where $R^1$ is hydrogen or methyl and $R^2$ is hydrogen, carboxyl, a carboxylate salt, an ester, an amide or a

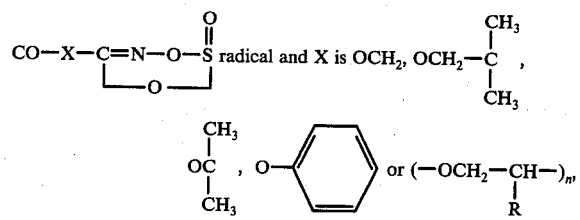

in which $n$ is from 1 to 50 and R is H, alkyl, preferably $C_1$ to $C_4$ alkyl, cycloalkyl, preferably $C_6$ cycloalkyl, and aryl, preferably $C_6$ aryl.

These polymers are polyfunctional macromolecular materials of which the side branches contain dioxathiazole-2-oxide groups and which are amenable to appropriate substitution reactions. The new polymers have molecular weights of from 1,000 to 3,000,000, preferably from 10,000 to 100,000.

A further object of the invention is the manufacture of such polymers. This object is achieved by a method wherein unsaturated 1,3,2,4-dioxathiazole-2-oxide compounds of the general formula

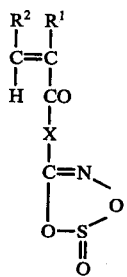

in which $R^1$ is H or alkyl; $R^2$ is H, COOR, COOM, CONHR or

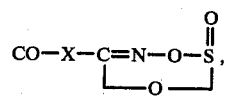

where M is a metal cation and R is H, alkyl, cycloalkyl or aryl, and X is $OCH_2$,

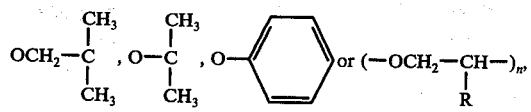

in which $n$ is from 1 to 50, are polymerized, if appropriate together with one or more other olefinic monomers.

Particularly suitable unsaturated dioxathiazole-2-oxide derivatives are the compounds I to IV

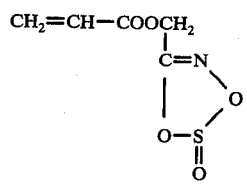

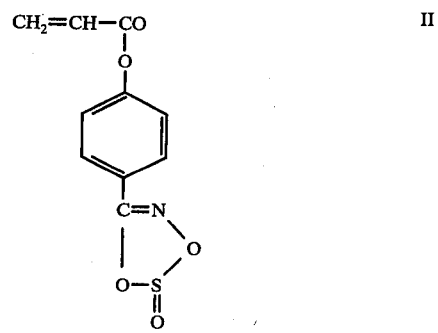

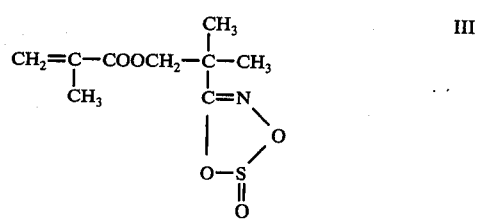

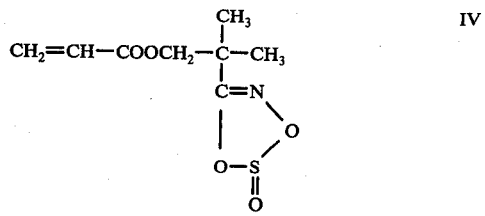

Such unsaturated dioxathiazole-2-oxide compounds may be manufactured, eg., by first reacting the corresponding acid chlorides (eg. $CH_2$=CH—COOCH$_2$-COCl) with hydroxylamine or a salt of hydroxylamine to give the corresponding hydroxamic acids, and then cyclizing these with thionyl chloride.

Examples of suitable olefinic comonomers are olefins, eg. ethylene, propylene, butadiene and isoprene; styrene and substituted styrenes, eg. α-methylstyrene, p-chlorostyrene and p-methylstyrene; acrylic acid esters and methacrylic acid esters, eg. of methanol, ethanol, butanol and ethylcyclohexanol; hydroxy and amino derivatives of acrylic acid esters, eg. hydroxypropyl acrylates and dimethylaminoethyl acrylate; acrylamide and methacrylamide and substituted amides, eg. N-methylolacrylamide, N-methylolmethacrylamide and their ethers; acrylonitrile and methacrylonitrile; vinyl esters, eg. vinyl acetate and vinyl propionate; vinyl ethers, eg. methyl vinyl ether or ethyl vinyl ether; fumaric acid, maleic acid and itaconic acid, and esters and anhydrides of these acids. It is also possible to copolymerize two or more of these monomeric compounds with the unsaturated dioxathiazole-2-oxide compounds.

The proportion of monomer units of unsaturated dioxathiazole-2-oxide derivatives in the copolymers may vary within broad limits, eg. it may be from 1 to 99 percent by weight and in particular from 5 to 20 percent by weight.

The polymerization is initiated either thermally or by conventional free-radical initiators. Examples of suitable initiators are hydrogen peroxide, inorganic peroxides or organic hydroperoxides and peroxides, aliphatic azo compounds which decompose into free radicals, redox catalyst systems, eg. the systems persulfate plus ascorbic acid, sodium bisulfite or iron-II salts, and the chelates of transition metals known to form free radicals, particularly those chelates in which the metal is in a suitable valency state, eg. chelates of manganese-(III), cobalt-(III), copper-(II) and cerium-(IV), with 1,3-dicarbonyl compounds.

The initiators are in general used in an amount of from 0.05 to 5 percent by weight, based on the amount of monomer. The optimum amount and the most effective initiator may easily be determined experimentally.

The polymerization may be carried out in bulk or in the presence of solvents or diluents. Suitable examples of the latter are alcohols, ketones, ethers, aliphatic, cycloaliphatic and aromatic hydrocarbons, formamide and dimethylformamide. Water is a particularly advantageous diluent.

The suspension, solution or emulsion polymerization processes conventionally used with other monomers are also applicable to the above process. In respect of assistants which may be used, eg. buffers, dispersing agents, protective colloids and the like, the process of the invention again does not differ from conventional processes.

The polymerization may be carried out within a broad temperature range, from about 0° to 150°, preferably from 50° to 120° C. In general, the polymerization is carried out under atmospheric pressure, but lower or higher pressures, e.g., up to 3,000 atmospheres gauge, may also be used. When using low-boiling comonomers, in particular, higher pressures are used to ensure a sufficient concentration of the comonomer in the reaction mixture.

The copolymerization of the unsaturated dioxathiazole-2-oxide derivatives with ethylene or butadiene is advantageously carried out in emulsion, by introducing the copolymerizable monomers into an aqueous emulsion which contains an emulsifier initiator, a buffer system and, optionally, a protective colloid, and carrying out the polymerization under superatmospheric pressure. The copolymerization with acrylic acid esters is suitably carried out in aromatic or aliphatic hydrocarbons under the conventional conditions for the polymerization of acrylic acid esters.

The polymers of the invention may be used, eg., for the manufacture of moldings, coatings or adhesives, for which purposes they may also be used as mixtures with other plastics, eg. polyethylene, polypropylene or copolymers of ethylene and vinyl acetate. Such products have particularly high affinity for dyes. Because of their surface-active and anti-static properties the polymers manufactured according to the invention may be used, inter alia, for finishing paper and textiles. Copolymers of acrylic acid esters which contain from about 2 to 20 percent by weight of a dioxathiazole-2-oxide derivative and from about 2 to 10 percent by weight of hydroxylic monomers, eg. hydroxypropyl acrylates, may be used as corrosion inhibitors. If the copolymer contains other reactive groups, e.g. —OH, —NH$_2$ or —COOH, in addition to the dioxathiazole-2-oxide groups, the copolymer may be cross-linked photochemically or thermally and may be used as a chemically curing surface coating.

The parts and percentages in the examples are by weight. The K values are a measure of the mean molecular weight and have in each case been determined by the method of H. Fikentscher, Cellulosechemie 13 (1932), 58, using a one percent strength solution in dimethylformamide.

EXAMPLE 1

100 parts of the compound I and 0.1 part of azo-bis-isobutyronitrile are heated at 60° C for 4 hours under a nitrogen atmosphere, whilst stirring. After precipitation with methanol, washing and drying, 90 parts of a polymer having a K value of 71 and a glass transition temperature $T_G$ of +58° C are obtained. The polymer contains 23.8% of sulfur (theoretical content 24.1%).

EXAMPLES 2 TO 12

Ethyl acrylate and compound II were mixed in various ratios, in each case 0.1% of azo-bis-isobutyronitrile was added, and the mixtures were heated at 70° C for 2 hours. The copolymers were precipitated with methanol, washed and dried for 10 hours in a vacuum drying cabinet at 60° C and 12 mm Hg. The properties of the products obtained are summarized in the table which follows:

TABLE

| Ex. | Proportion of II in the batch (in %) | Conversion (in %) | K value | Proportion of II in the copolymer (in %) |
|---|---|---|---|---|
| 2 | 1 | 96.5 | 66 | 0.6 |
| 3 | 5 | 94.0 | 65 | 4.2 |
| 4 | 10 | 96.5 | 62 | 9.2 |
| 5 | 20 | 96.0 | 68 | 16.0 |
| 6 | 30 | 96.5 | 69 | 24.5 |
| 7 | 40 | 99 | 69 | 33.0 |
| 8 | 50 | 93.5 | 68 | 42.1 |
| 9 | 60 | 98 | 67 | 54.3 |
| 10 | 70 | 100 | 66 | 62.0 |
| 11 | 80 | 100 | 65 | 87.5 |
| 12 | 90 | 100 | 61 | 87.5 |

EXAMPLE 13

30 parts of the compound III, 2 parts of sodium pyrophosphate, 4.5 parts of potassium persulfate, 2 parts of the sodium salt of a sulfonated fatty alcohol of 10 to 15 carbon atoms and 1,000 parts of water are mixed. Sufficient butadiene is injected into this mixture, whilst stirring, for 8 hours at 90° C, to give a butadiene pressure of 2.85 atmospheres gauge in the gas space. After a reaction time of 8 hours the dispersion has a solids content of 20 percent by weight. The K value of the polymer is 74. The content of compound III in the copolymer is 10.5%.

EXAMPLE 14

The procedure of Example 13 is followed to copolymerize the compound IV with styrene. A dispersion of 25% solids content is obtained in 8 hours at 90° C. The K value of the copolymer, which contains 17.5 percent by weight of compound IV, is 74.4.

EXAMPLE 15

If the procedure of Example 9 is followed except that the ethyl acrylate is replaced by acrylonitrile, a conversion of 72%, a K value of 70.5 and a 51% content of compound II in the copolymer are obtained.

We claim:

1. A polymer of (a) 1 to 100 weight percent of an ethylenically unsaturated 1,3,2,4-dioxathiazole-2-oxide compound of the formula

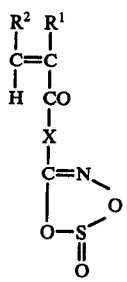

in which $R^1$ is H or methyl, $R^2$ is H, COOR, COOM, CONHR or

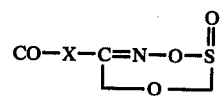

wherein M is a metal cation and R is H, alkyl, cycloalkyl or aryl, and X is $OCH_2$, $$OCH_2-\underset{\underset{CH_3}{|}}{\overset{\overset{CH_3}{|}}{C}} \qquad O-\underset{\underset{CH_3}{|}}{\overset{\overset{CH_3}{|}}{C}},$$

$$O-\phantom{}\underset{}{\bigcirc} \quad \text{or} \quad (-OCH_2-\underset{\underset{R}{|}}{CH})_n,$$

in which $n$ is from 1 to 50, and (b) 0 to 99 weight percent of a dissimilar ethylenically unsaturated monomer, said dissimilar monomer being devoid of groups which are reactive with cyclic dioxathiazole-2-oxide of said polymer under polymerization conditions, said polymer having a molecular weight of from 1,000 to 3,000,000.

2. A polymer as set forth in claim 1, wherein $R^1$ and $R^2$ are H and X is $OCH_2$.

3. A polymer as set forth in claim 1, wherein $R^1$ and $R^2$ are H and X is $$O-\phantom{}\underset{}{\bigcirc}.$$

4. A polymer as set forth in claim 1, wherein $R^1$ is methyl, $R^2$ is H and X is $OCH_2-C(CH_3)_2$.

5. A polymer as set forth in claim 1, wherein $R^1$ and $R^2$ are H and X is $OCH_2-C(CH_3)_2$.

6. A polymer as set forth in claim 1 wherein the amount of component (b) is from 80 to 95 percent by weight.

7. A polymer as set forth in claim 1 wherein the amount of component (a) is 100 percent.

8. A process as set forth in claim 1 wherein the molecular weight of the polymer is from 10,000 to 100,000.

* * * * *